(12) United States Patent
Destro

(10) Patent No.: US 9,608,392 B1
(45) Date of Patent: Mar. 28, 2017

(54) ARRANGEMENT FOR ENERGIZED RAIL FOR MOVABLE SOCKETS

(71) Applicant: Luiz Fernando Destro, Sao Paulo (BR)

(72) Inventor: Luiz Fernando Destro, Sao Paulo (BR)

( * ) Notice: Subject to any disclaimer, the term of this patent is extended or adjusted under 35 U.S.C. 154(b) by 0 days.

(21) Appl. No.: 14/416,618

(22) PCT Filed: May 29, 2014

(86) PCT No.: PCT/BR2014/000178
§ 371 (c)(1),
(2) Date: Jan. 22, 2015

(87) PCT Pub. No.: WO2015/179930
PCT Pub. Date: Dec. 3, 2015

(51) Int. Cl.
*H01R 25/00* (2006.01)
*H01R 25/14* (2006.01)

(52) U.S. Cl.
CPC ......... *H01R 25/145* (2013.01); *H01R 25/142* (2013.01)

(58) Field of Classification Search
CPC ............................. H01R 25/14; H01R 25/142
USPC ................................................. 439/110–120
See application file for complete search history.

(56) References Cited

U.S. PATENT DOCUMENTS

| | | | | |
|---|---|---|---|---|
| 2,274,136 A | * | 2/1942 | Frank | H01R 25/142 439/118 |
| 2,348,665 A | * | 5/1944 | Von Gehr | H01R 25/14 191/23 R |
| 2,977,566 A | * | 3/1961 | Neumann | F21V 21/13 362/431 |
| 2,981,917 A | * | 4/1961 | Glass | F21V 21/35 191/1 R |
| 3,596,226 A | * | 7/1971 | Meltzer | H01R 25/14 439/118 |
| 3,639,885 A | * | 2/1972 | Yoshiya | H01R 25/142 439/118 |
| 4,003,618 A | * | 1/1977 | Booty | H01R 25/162 439/113 |
| 4,190,309 A | * | 2/1980 | Glass | F21V 21/35 439/118 |
| 4,494,808 A | * | 1/1985 | Widell | H01R 25/14 439/119 |

(Continued)

FOREIGN PATENT DOCUMENTS

JP 2009170147 * 7/2009

*Primary Examiner* — Neil Abrams
(74) *Attorney, Agent, or Firm* — Garrett James O'Sullivan

(57) ABSTRACT

Arrangement introduced on rail for movable sockets susceptible to receive several sockets by the fitting and turn on the rail's body. It comprises an electrical energy conductor rail with a body that internally has a rectangular gap that prolongs for the whole extension of the rail configuring an access and housing for movable sockets to be inserted on the rail. Once chosen the assembly local of the movable sockets along the rail longitudinal profile, each socket has its metallic contacts inserted in the rail's gap from the frontal aperture and turned to 90 degrees, making the convex saliences, with interference, to meet the metallic plates, closing electric contact and energizing said socket. The removal of a socket occurs by a new 90 degrees turn in relation to the rail, resulting on the separation of the metallic contacts of the plates and the consequent desenergization of the socket.

1 Claim, 5 Drawing Sheets

(56) References Cited

U.S. PATENT DOCUMENTS

| | | | | |
|---|---|---|---|---|
| 4,949,487 | A | * | 8/1990 | Kibarer .................. G09F 13/28 362/404 |
| 5,052,937 | A | * | 10/1991 | Glen ..................... H01R 25/14 439/120 |
| 5,759,051 | A | * | 6/1998 | Cancellieri .......... H01R 25/142 439/118 |
| 7,481,658 | B2 | * | 1/2009 | Jong ..................... H01R 25/14 439/118 |
| 7,544,071 | B2 | * | 6/2009 | Jong ................... H01R 13/453 439/113 |
| 8,430,679 | B1 | * | 4/2013 | Long ................... H01R 13/703 439/118 |
| 9,077,129 | B1 | * | 7/2015 | Welch .................. H01R 25/006 |

* cited by examiner

ARRANGEMENT FOR ENERGIZED RAIL FOR MOVABLE SOCKETS

The present utility model application reveals an arrangement introduced on energized rail for movable sockets, which is susceptible for receiving several movable sockets simultaneously, energizable by the simple fit and turn thereof in the body of the rail.

The rail can be mounted directly on a wall, by adhesive means or fastening, or still can be used over the floor, as a power strip.

Furthermore, the rail can be connected directly on an electrical box on the wall or still comprise a plug for socket connection, what represents a product with extreme versatility on its use.

DESCRIPTION OF PRIOR ART

On the current state of the art, several kinds of arrangement on sockets or power strips are known.

Usually, the power strips comprise plugs that can be fitted on the socket and its compact arrangement limits the reach of the connection wires of the products to be energized to a small space or determined local.

Said power strips comprise sockets parallelly positioned in relation to each other, wherein, in many situations, the user has difficulties to use immediately adjacent sockets, due to the dimension of the appliances' plugs, of different sizes and shapes. Thus, many times, when a plug is connected to the power strip, the access to the socket close by remains obstructed, what impairs its use and largely eliminates the product's function, which is to distribute energy to more than one appliance.

Thinking about this and other inconveniences, constructive alternatives were developed for power strips and electrical rails.

The Brazilian patent application PI 9101509 shows a movable socket coupled to an electric energy conductive rail, in order to allow the assembly of the socket in different positions along of the energized rail. This rail is attached to a wall by means of screws above the foot panel and has a labyrinth through which the electrical socket is disposed.

An inconvenience of said rail refers to the fact that the assemblage of the socket on the rail must occur laterally, through the rail's end, in order to longitudinally move the socket until the operation position. It causes the direct contact among the components, what can produce wearing during the use and handling of the parts.

Furthermore, the labyrinth has a complex construction with several parts susceptible to wearing and breaking by the constant or wrong way handling.

Moreover, in order to remove a socket from the rail it is necessary to remove the others, in order to have access to the rail's end, what does not grant a practice quality and versatility to the whole set.

OBJECTIVES OF THE MODEL

In order to overcome the inconveniences of the current art, the present model shows an arrangement introduced on an energized rail for movable sockets, on which movable sockets can be fitted, assembled by a simple turn, wherein it is sufficient to the user choose the position of socket introduction, introduce it in the rail's gap and turn it 90 degrees, closing the electric contact.

A great advantage of the present model refers to the fact that the rail can be assembled directly on the electrical box of the wall or still connected to a socket by means of a plug.

Furthermore, the rail can be used on the wall or floor, being fastened by adhesive or fastening means, or still can be used over the floor as a power strip, since its body is made from insulating material.

The rail's electrical contacts remain protected internally to the gap and the electric contact closing occurs by simply contact, through the socket turn. Thus, the components have practical and simple shape, eliminating the coupling complex means.

Furthermore, the introduction or removal of the socket can be done directly on the chosen position, without the necessity of removing other socket from the rail.

BRIEF DESCRIPTION OF THE DRAWINGS

The objective of the present model will be better characterized based on the attached drawings, in which.

DETAILED DESCRIPTION OF THE DRAWINGS AND OF THE MODEL

Figures 1, 2, 3:
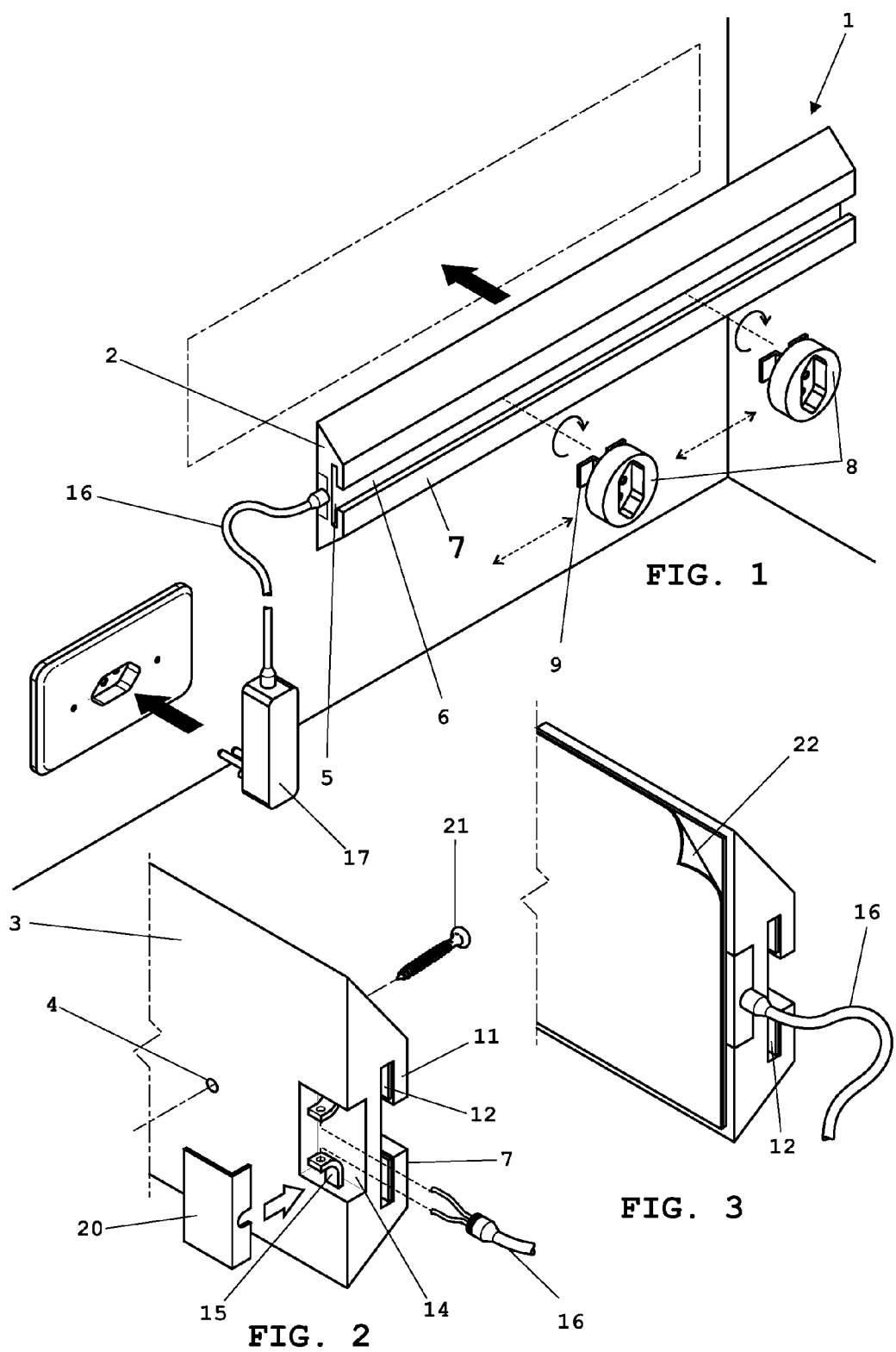
FIG. 1 is an exploded perspective view of the energizible rail and sockets, in an assembly on wall, with connection by means of electrical plug.
FIG. 2 is a partial exploded view, in back perspective, revealing the rail's electrical terminals and the connection electric wire to the electrical network, protected by a closing cap, in a fastening option by means of screws.
FIG. 3 is a back perspective view of the rail in a fastening option by adhesive means.

According to the FIGS. 1 to 3, the present model comprises a rail (1) conductor of electric energy with a body (2) made from insulating material of longitudinal profile preferably trapezoidal, with a larger base (3) having flat and smooth surface and provided with holes (4).

Longitudinally, said body (2) internally has a rectangular gap (5) that prolongs itself through the whole extension of the rail (1) and that communicates with a rectangular frontal aperture (6) of the smaller base (7), making an access and housing for movable sockets (8) to be inserted in said rail (1).

The movable sockets (8) have metallic contacts (9) with a "L" profile provided with convex saliences (10) and that are susceptible of inserting on the interior of the gap (5) of the rail (1) from the rectangular frontal aperture (6).

Figure 8:
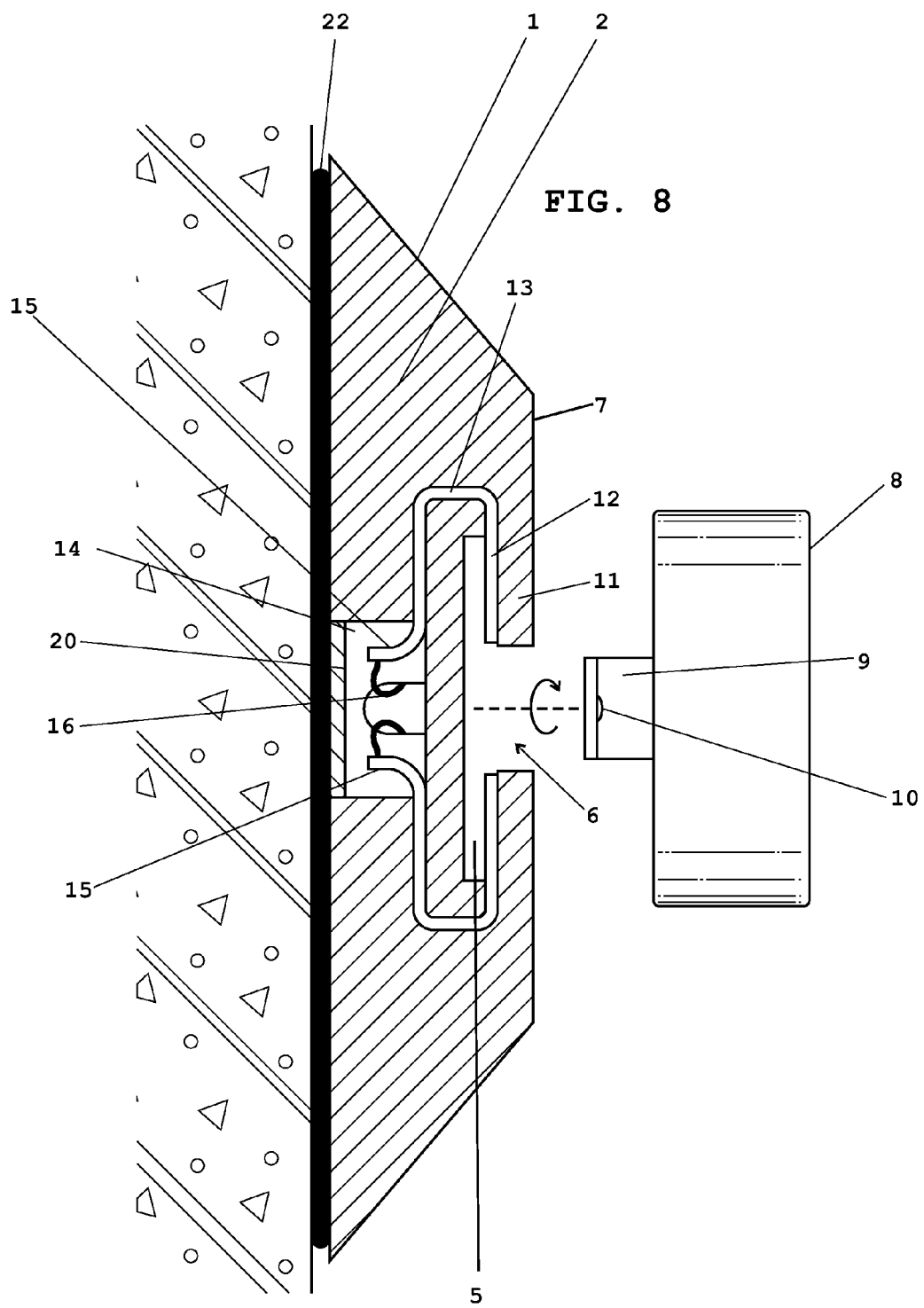
FIG. 8 is a transversal section view of the rail attached to the wall or floor, in this option by adhesive means, with the electric socket in fitting position on the rail's body gap.

As better visualized on FIGS. 2 and 8, internally and facing the rectangular tabs (11) of the smaller base (7), the rail (1) has metallic contact plates (12) that prolong through the whole longitudinal extension of said rail (1), wherein said plates (12) have curved sections (13) that prolong and project themselves on the interior of a rectangular compartment (14), configuring electric contact terminals (15).

Figure 4:
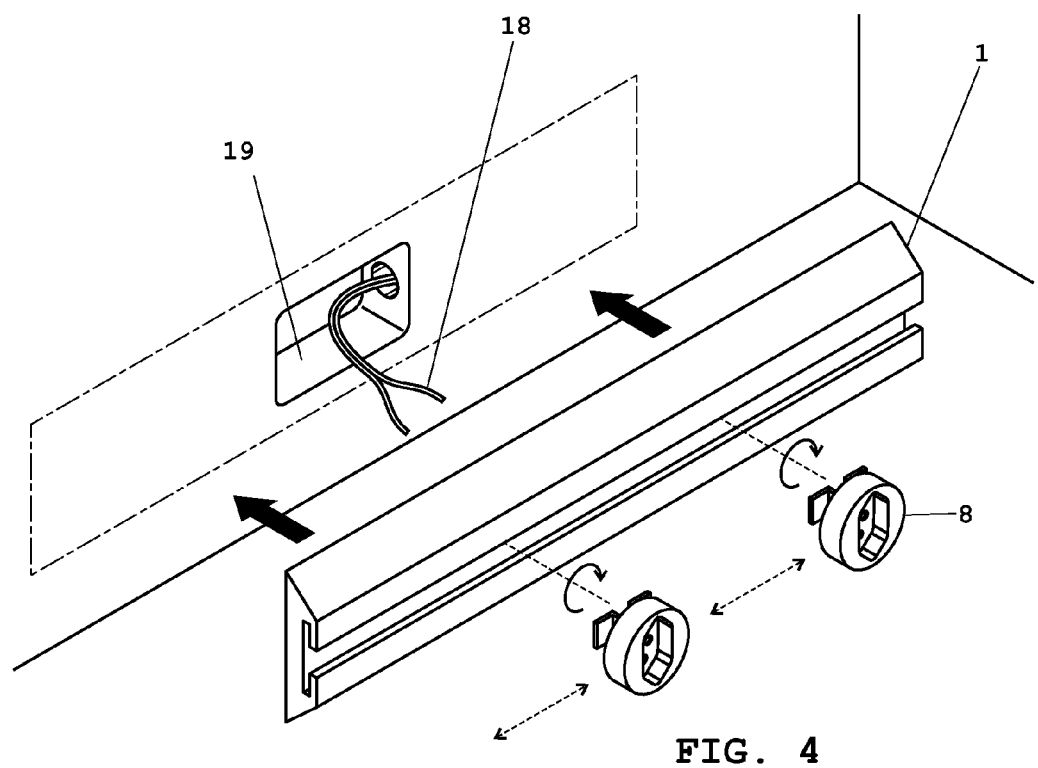
FIG. 4 is an exploded perspective view of the energizable rail and sockets, in an assembly on the wall, with connection directly on the electrical box of the wall, without the presence of electrical plug.
Figure 5:
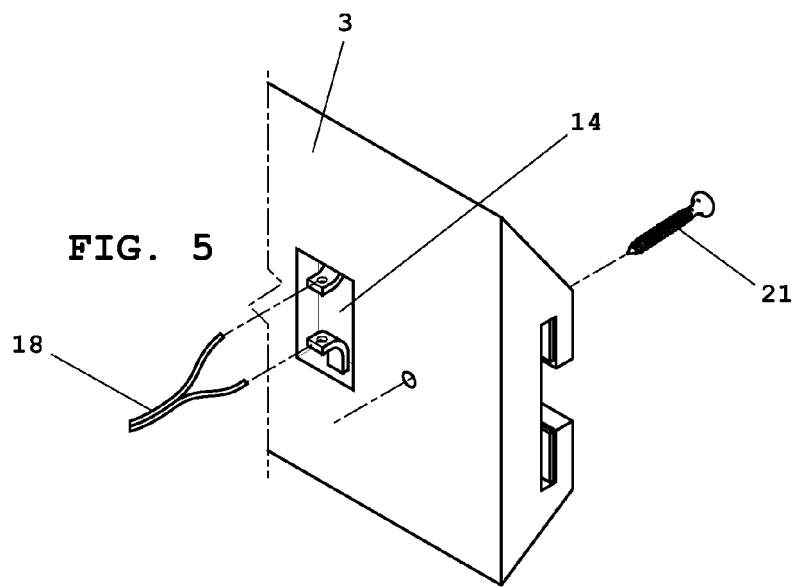
FIG. 5 is a back perspective view revealing the electric terminals of the rail and the connection electric wire to the electrical network, for the connection option directly on the electrical box of the wall (according to the FIG. 4) and with fastening by means of screws.

As can be observed from FIGS. 1, 4 and 5, the contact terminals (15) are brought together to an energy wire (16), that makes the rail electric feeding to the electric energy network, either by the electric plug either by direct connection on the power cable (18) of the electrical box (19) of the wall.

When the connection of the rail (1) with electric plug (17) by means of the wire (16) is used, the rectangular compartment (14) remains positioned in one of the rail's end (1) and closed by means of a cap (20) in "L" shape, as can be seen on FIG. 2.

When the connection of the rail (1) directly on the power cable (18) of the electric box (19) of the wall is used, the compartment (14) remains positioned internally to the larger base (3) and without cap, as can be seen on FIG. 5.

According to the best visualization in FIGS. 2 and 3, the rail (1) can be attached to the wall by means of fastening screws (21), that pass over the holes (4) or by means of adhesive means (22), for instance, double face tapes, among others, or still can be used on the floor as a power strip.

Figure 9:
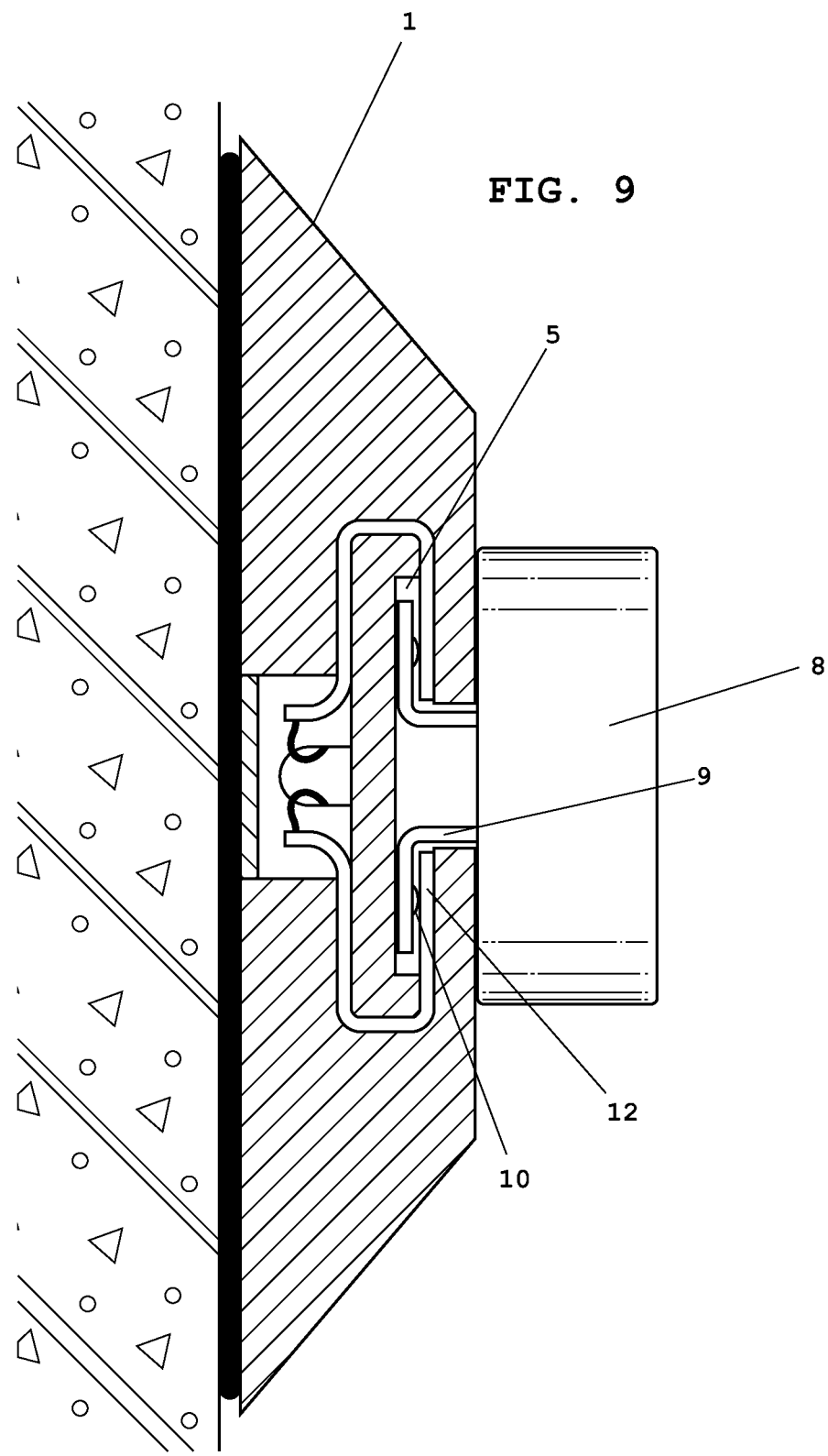
FIG. 9 is a transversal section view of the rail from FIG. 8 with the movable socket inserted and turned 90 degrees in interior of rail body gap, on the fastened and energized condition.

According to the FIGS. 8 and 9, once the is chosen the assembly local of the movable sockets (8) along the rail longitudinal profile (1), each socket (8) has their metallic contacts (9) inserted in the interior of the gap (1) of the rail from the rectangular frontal aperture (6) and turned to 90 degrees, causing the convex saliences (10), with interference, to meet the metallic plates (12), closing electric contact and energizing said movable sockets (8).

The removal of a movable socket (8) is done by a new 90 degrees turn in relation to the rail (1), when occur the separation of the metallic contacts (9) of the plates (12) and the consequent disenergization of the socket (8).

Figure 6:
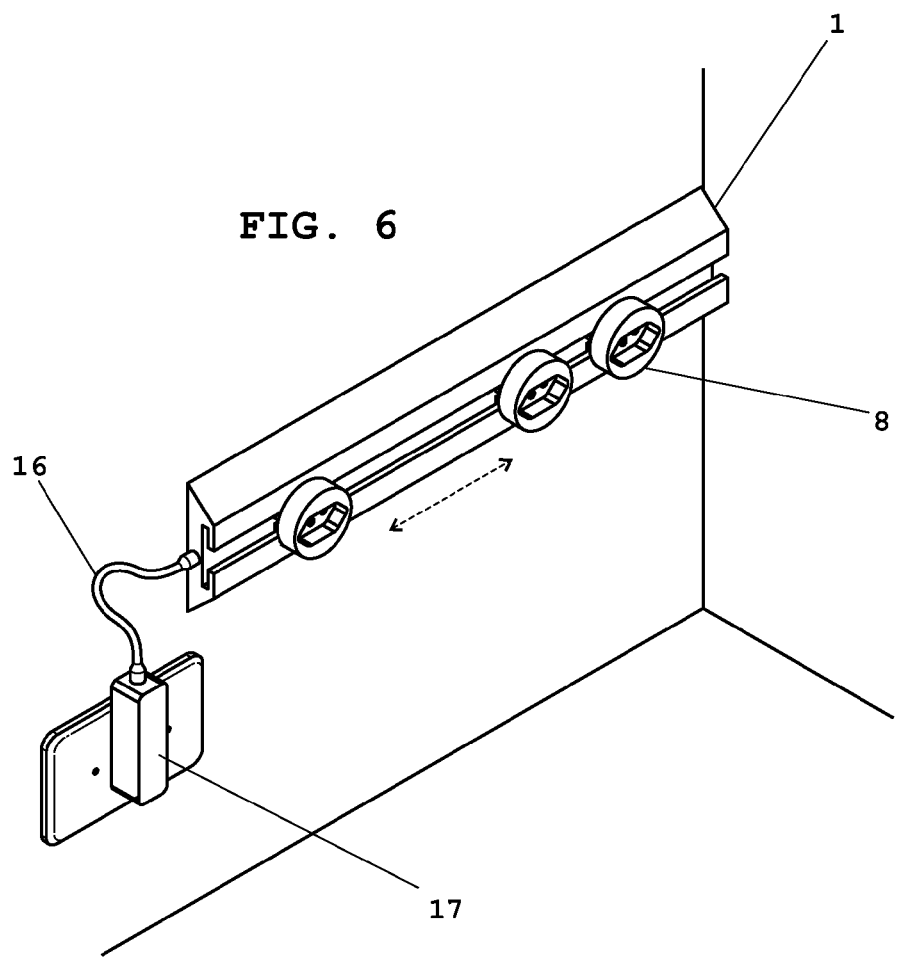
FIG. 6 is a perspective view that reveals the rail attached to the wall and connected by means of the electric plug, showing the longitudinal movement of the movable sockets.
Figure 7:
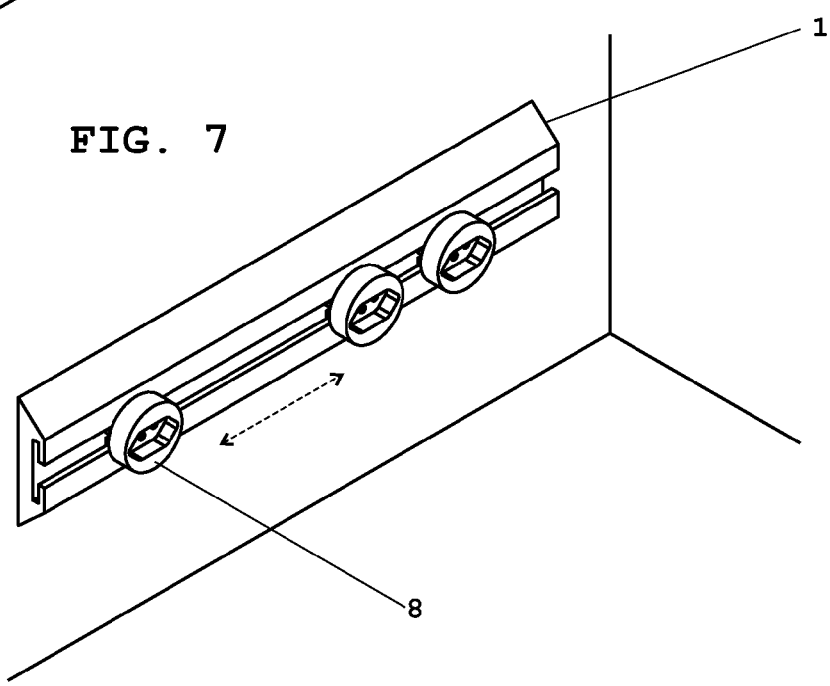
FIG. 7 is a perspective view the reveals the rail attached to the wall and directly connected on the electrical box, showing the longitudinal movement of the movable sockets.

As can be observed on FIGS. 6 and 7, the sockets (8) can be positioned or longitudinally moved along the rail profile (1) for a better positioning of each one, according to the user necessities, without the position of a socket (8) interfering in the position of another socket (8).

In this way, the present application reveals and defines an energized rail (1) that can receive electric sockets (8) in different positions, in quick, practical and simplified ways, fitting the rail (1) to several fastening and use ways with high versatility.

What is claimed is:
1. An arrangement introduced in energized rail for movable sockets, comprising:
   a. an electric energy conductor rail with a body made from insulating material of longitudinal profile preferably trapezoidal, with a larger base of flat and smooth base and provided with holes;
   b. longitudinally, said body internally comprises a rectangular gap that prolongs itself for the whole extension of the rail and that communicates with a rectangular frontal aperture of the smaller base, configuring an access and housing for movable sockets to be inserted in said rail;
   c. the movable sockets comprise metallic contacts with a "L" profile provided with convex saliences and that are susceptible of being inserted in the interior of the gap of the rail from the rectangular frontal aperture;
   d. internally and facing the rectangular tabs of the smaller base, the rail has metallic contact plates that prolongs for the whole longitudinal extension of said rail, wherein said plates has curved sections that prolongs and projects on the interior of a rectangular compartment, configuring electric contact terminals;
   e. said contact terminals are brought together to an energy wire, that makes rail electrical feeding to the electrical energy network, either through electric plug or by direct connection on the power cable of the electrical box of the wall, wherein when the rail connection by means of the wire to the electric plug is used, the rectangular compartment remains positioned in one of the rail's end and closed by means of a cap in "L" shape, or when used the connection of the rail directly on the power cable of the electrical box of the wall, the compartment remains positioned internally to the larger base and without cap;
   f. the rail can be fastened to the wall by means of fastening screws that pass over the holes or by means of adhesive means, for instance, double face taps, among others, or still can be used on the floor as a power strip;
   g. once the assembly local of the movable sockets along the longitudinal profile of the rail is chosen, each socket has its metallic contacts inserted in the interior of the gap of the rail from the rectangular frontal aperture and turned to 90 degrees, making the convex saliences, with interference, to meet the metallic plates, closing the electric contact and energizing said movable sockets;
   h. the removal of on movable socket occur by a new 90 degrees turn in relation to the rail when the separation of the metallic contacts happens and the consequent de-energization of the socket;
   i. the sockets can be positioned or longitudinally moved along the rail profile, without the position of a socket interfering in the position of another socket.

* * * * *